US011862872B2

(12) United States Patent
Rahikkala et al.

(10) Patent No.: US 11,862,872 B2
(45) Date of Patent: Jan. 2, 2024

(54) APPARATUS FOR ANTENNA OPTIMIZATION AND ASSOCIATED METHODS

(71) Applicant: Silicon Laboratories Inc., Austin, TX (US)

(72) Inventors: Pasi Rahikkala, Vihti (FI); Tuomas Hänninen, Helsinki (FI)

(73) Assignee: Silicon Laboratories Inc., Austin, TX (US)

( * ) Notice: Subject to any disclaimer, the term of this patent is extended or adjusted under 35 U.S.C. 154(b) by 133 days.

(21) Appl. No.: 17/491,221

(22) Filed: Sep. 30, 2021

(65) Prior Publication Data

US 2023/0096605 A1 Mar. 30, 2023

(51) Int. Cl.
*H01Q 1/14* (2006.01)
*H01Q 7/00* (2006.01)

(52) U.S. Cl.
CPC .................................. *H01Q 7/005* (2013.01)

(58) Field of Classification Search
CPC ...................................................... H01Q 7/005
USPC .......................................................... 343/886
See application file for complete search history.

(56) References Cited

U.S. PATENT DOCUMENTS 4,328,501 A 5/1982 DeSantis
4,799,066 A 1/1989 Deacon
5,631,611 A 5/1997 Luu
5,874,926 A 2/1999 Tsuru
5,889,445 A 3/1999 Ritter
5,949,299 A 9/1999 Harada
5,995,814 A 11/1999 Yeh
6,009,318 A 12/1999 Freed
6,329,886 B1 12/2001 Ogoro
6,603,430 B1 8/2003 Hill
6,862,441 B2 3/2005 Ella
6,980,776 B2 12/2005 Shimada
6,990,357 B2 1/2006 Ella
7,034,630 B2 4/2006 Rijks
7,058,372 B1 6/2006 Pardoen
7,088,307 B2 8/2006 Imaizumi
7,116,185 B2 10/2006 Ohi
7,155,252 B2 12/2006 Martin
7,193,477 B2 3/2007 Chang et al.
7,199,684 B2 4/2007 Aigner
7,248,844 B2 7/2007 Rofougaran
7,323,939 B2 1/2008 Han et al.
7,330,085 B2 2/2008 Ezzeddine
(Continued)

FOREIGN PATENT DOCUMENTS

CN 106505962 A 3/2017
EP 2214306 8/2010
KR 20150072119 A 6/2015

OTHER PUBLICATIONS

U.S. Appl. No. 15/250,719, filed Aug. 2016, Rahikkala.
(Continued)

*Primary Examiner* — Jean B Jeanglaude
(74) *Attorney, Agent, or Firm* — Law Offices of Maximilian R. Peterson

(57) ABSTRACT

An apparatus includes a module comprising an antenna having at least one antenna component. The apparatus further includes at least one tuning component coupled to the at least one antenna component. The at least one tuning component is external to the module.

20 Claims, 10 Drawing Sheets

(56) References Cited

U.S. PATENT DOCUMENTS 7,466,277 B2 12/2008 Ishizuka
7,489,914 B2 2/2009 Govind
7,518,469 B2 4/2009 Kemmochi
7,557,757 B2 7/2009 Deavours
7,586,388 B2 9/2009 Harada
7,683,733 B2 3/2010 Li
7,755,435 B2 7/2010 Lu et al.
7,978,024 B2 7/2011 Cheng
8,068,795 B2 11/2011 Bavisi
8,081,047 B2 12/2011 Royak
8,138,853 B2 3/2012 Chu
8,164,387 B1 4/2012 Apel
8,174,390 B2 5/2012 Kim
8,229,367 B2 7/2012 Chan et al.
8,306,489 B2 11/2012 Schwarzmueller
8,344,952 B2 1/2013 Yi
8,368,481 B2 2/2013 Jin
8,436,695 B2 5/2013 Mu
8,493,126 B2 7/2013 Sankaranarayanan
8,633,781 B2 1/2014 Bradley
8,842,410 B2 9/2014 Chan
9,059,681 B2 6/2015 Tanaka
9,083,301 B2 7/2015 Tanaka
9,106,204 B2 8/2015 Fritz
9,306,535 B2 4/2016 Bradley
9,316,723 B2 4/2016 Tayrani
9,397,720 B2 7/2016 Jerng
9,520,854 B2 12/2016 Kim
9,647,706 B2 5/2017 Salfelner
9,680,442 B2 6/2017 Salfelner
9,917,566 B2 3/2018 Salfelner
9,939,471 B1 4/2018 Omoumi
9,991,597 B2 6/2018 Velandia
10,071,605 B1 9/2018 Liang
10,305,532 B1 5/2019 Jantzi
10,374,300 B2 8/2019 Rahikkala
2002/0118075 A1 8/2002 Ohwada
2003/0012808 A1 7/2003 Ella
2003/0174093 A1 9/2003 Huber
2003/0210189 A1 11/2003 Jinushi
2005/0003771 A1 1/2005 De Ruijter
2005/0174297 A1 8/2005 Cake
2005/0208917 A1 9/2005 Roufoogaran
2006/0044080 A1 3/2006 Hagiwara
2006/0092079 A1 5/2006 de Rochemont
2006/0103578 A1 5/2006 Landaeus
2007/0001704 A1 1/2007 O'Mahony
2007/0024377 A1 2/2007 Wang et al.
2007/0268092 A1 11/2007 Inoue
2008/0129610 A1 6/2008 Tsafati et al.
2008/0174383 A1 7/2008 Zolomy et al.
2008/0186106 A1 8/2008 Christian
2008/0278258 A1 11/2008 Liu
2009/0015500 A1 1/2009 Hoshiai
2009/0085689 A1 4/2009 Rohani
2009/0121959 A1 5/2009 Li
2009/0130999 A1 5/2009 Chen
2009/0174618 A1 7/2009 Huang
2009/0251382 A1 10/2009 Umehara
2009/0315792 A1 12/2009 Miyashita
2009/0322617 A1 12/2009 Tseng
2010/0073248 A1 3/2010 Motta
2010/0109846 A1 5/2010 Nagai
2010/0231451 A1 9/2010 Noguchi
2010/0238079 A1 9/2010 Ayatollahi
2010/0253581 A1 10/2010 Tsou
2010/0265145 A1 10/2010 Chung
2010/0289700 A1 11/2010 Yang
2011/0223873 A1 9/2011 Qiu
2011/0256841 A1 10/2011 Kakuya
2012/0001821 A1 1/2012 Nakano
2012/0112972 A1 5/2012 Ogawa
2012/0154071 A1 6/2012 Bradley
2012/0229360 A1 9/2012 Jagielski
2012/0314734 A1 12/2012 Zierdt
2013/0033410 A1 2/2013 Wong
2013/0214812 A1 8/2013 Koo
2013/0307742 A1 11/2013 Hu
2013/0314288 A1 11/2013 Tayrani
2013/0334215 A1 12/2013 Chen
2013/0341411 A1 12/2013 Kai
2013/0342421 A1* 12/2013 Katz ........................ H01Q 1/24
343/852
2014/0111381 A1 4/2014 Lee
2014/0111382 A1 4/2014 Lee
2014/0113679 A1 4/2014 Wehrmann
2014/0125540 A1 5/2014 Tetsuno
2014/0125548 A1 5/2014 Jouanlanne
2014/0125552 A1 5/2014 Takisawa
2014/0320351 A1 10/2014 Wei
2014/0327494 A1 11/2014 Sato
2014/0375507 A1 12/2014 Lin
2014/0375527 A1 12/2014 Rutfors
2015/0022402 A1 1/2015 Gavilan
2015/0048896 A1 2/2015 Kovac
2015/0311881 A1 10/2015 Nagumo
2015/0349726 A1 12/2015 Han et al.
2016/0156335 A1 6/2016 Takeuchi
2016/0164474 A1 6/2016 Beltran
2016/0268992 A1 9/2016 Salfelner
2016/0336649 A1 11/2016 Yu
2017/0214378 A1 7/2017 Black
2017/0244442 A1 8/2017 Mizokami
2018/0062254 A1 3/2018 Rahikkala
2018/0123221 A1* 5/2018 Finn ..................... H01Q 1/2225
2018/0145410 A1 5/2018 Ban
2018/0316082 A1 11/2018 Keller
2019/0190149 A1 6/2019 Vida
2019/0280383 A1* 9/2019 Zolomy ............... H01Q 9/0421
2020/0127628 A1* 4/2020 Zolomy ................. H01Q 7/005

OTHER PUBLICATIONS

U.S. Appl. No. 16/439,458, filed Jun. 2019, Rahikkala.
U.S. Appl. No. 15/823,319, filed Nov. 2017, Zólomy.
U.S. Appl. No. 15/845,327, filed Dec. 2017, Vida.
U.S. Appl. No. 15/845,369, filed Dec. 2017, Vida.
U.S. Appl. No. 16/237,511, filed Dec. 2018, Zólomy.
U.S. Appl. No. 16/237,583, filed Dec. 2018, Zólomy.
U.S. Appl. No. 16/420,111, filed May 2019, Voor.
U.S. Appl. No. 16/420,116, filed Feb. 2019, Zólomy.
U.S. Appl. No. 16/719,925, filed Dec. 2019, Vida.
U.S. Appl. No. 16/724,160, filed Dec. 2019, Zólomy.
U.S. Appl. No. 17/491,195, filed Sep. 2021, Hänninen.
Johanson Technology, *High Frequency Ceramic Solutions*, 4 pgs., 2016.
Johanson Technology, *High Frequency Ceramic Solutions*, 4 pgs., 2014.
AN91445, *Antenna Design and RF Layout Guidelines*, Cypress, 60 pgs., 2014-2016.
Amotech Co., Ltd., *Datasheet*, 8 pgs., 2009.
Office communication in U.S. Appl. No. 15/250,719, 9 pgs.
Office communication in U.S. Appl. No. 15/250,719, 8 pgs.
Office communication in U.S. Appl. No. 15/823,319, 18 pgs.
Office communication in U.S. Appl. No. 15/823,319, 29 pgs.
Office communication in U.S. Appl. No. 15/823,319, 32 pgs.
Office communication in U.S. Appl. No. 15/823,319, 16 pgs.
AN923: EFR32 sub-GHz Matching Guide, Silicon Labs, Jun. 29, 2016, 25 pgs.
D.C. Youla, A New Theory of Broad-band Matching, IEE Transactions on Circuit Theory, Mar. 1964, 21 pgs.
Károly Géher: Linear Networks, 4th edition 1979, Hungarian Technical Book Press (pp. 434-436; translated portions included).
AN643: Si446x/Si4362 RX LNA Matching, Silicon Labs, 2014, 26 pgs.
Office communication in U.S. Appl. No. 15/845,327, 12 pgs.
Office communication in U.S. Appl. No. 15/845,327, 18 pgs.
Office communication in U.S. Appl. No. 15/845,327, 15 pgs.
Office communication in U.S. Appl. No. 15/845,327, 14 pgs.

(56) References Cited

OTHER PUBLICATIONS

Web page, "3.1 Multi-band Sub-1GHz tunable RF sub-system for smart meters" (Apr. 27, 2017, 2 pgs.), available at https://training.ti.com/multi-band-sub-1ghz-tunable-rf-sub-system-smart-meters.
Office communication in U.S. Appl. No. 16/237,511, 10 pgs.
Office communication in U.S. Appl. No. 16/237,511, 14 pgs.
Office communication in U.S. Appl. No. 16/237,583, 10 pgs.
Office communication in U.S. Appl. No. 16/237,583, 8 pgs.
Office communication in U.S. Appl. No. 16/237,583, 9 pgs.
Office communication in U.S. Appl. No. 16/420,111, 9 pgs.
Office communication in U.S. Appl. No. 16/420,111, 10 pgs.
Office communication in U.S. Appl. No. 16/420,116, 9 pgs.
Office communication in U.S. Appl. No. 16/420,116, 7 pgs.
Office communication in U.S. Appl. No. 16/719,925, 13 pgs.
Office communication in U.S. Appl. No. 16/719,925, 19 pgs.
Office communication in U.S. Appl. No. 16/719,925, 17 pgs.
Office communication in U.S. Appl. No. 16/724,160, 8 pgs.
AN427: EZ Radio Pro™ Si433X & Si443X RX LNA Matching, Silicon Labs, 2009, 22 pgs.
Liu et al., Excitation Techniques of Loop Current Mode of Ground Antenna, 2011 Cross Strait Quad Regional Radio Science and Wireless Technology Conference, 2011, 4 pgs.
Zahid et al., Analysis of a loop type ground radiation antenna based on equivalent circuit model, IET Microwave, Antennas & Propagation Journal, 2016, 6 pgs.
Cho et al., Loop-type ground antenna using capacitor, Electronics Letters, Jan. 6, 2011, vol. 47, No. 1, 1 pg.
Zhang et al., Bandwidth enhancement of ground antenna using resonant feeding circuit, Electronics Letters, Mar. 28, 2013, vol. 49, No. 7, 2 pgs.
Qu et al., Circular Polarized Ground Radiation Antenna for Mobile Applications, IEEE Transactions on Antennas and Propagation, vol. 66, No. 5, May 2018, pp. 2655-2660.
Zahid et al., Decoupler Deign for MIMO Antennas of USB Dongle Applications Using Ground Mode Coupling Analysis, Progress in Electromagnetics Research M, vol. 76, 113-122, 2018, 10 pgs.
Liu et al., Loop-Type Ground Radiation Antenna for Dual-Band WLAN Applications, IEEE Transactions on Antennas and Propagation, vol. 61, No. 9, Sep. 2013, pp. 4819-4823.
Qu et al., Compact dual-band antenna using inverted-L loop and inner rectangular loop for WLAN applications, Electronics Letters, Nov. 5, 2015, vol. 51, No. 23, pp. 1843-1844.
Liu et al., Excitation Techniques of Loop Current Mode of Ground Antenna, 2011 Cross Strait Quad-Regional Radio Science and Wireless Technology Conference, 2011, pp. 1732-1735.
Qu et al., Performance enhancement of ground radiation antenna for Z-wave applications using tunable metal loads, Electronics Letters, Oct. 27, 2016, vol. 52, No. 22, pp. 1827-1828.
Shin et al., Ground Radiation Antenna using Magnetic Coupling Structure, IEEE (date unknown, but before filing of the instant application), 3 pgs.
Qu et al., Ground Radiation Antenna for Mobile Devices, IEEE, 2017, 3 pgs.
Xu et al., Improvement of ground radiation antenna performance using compact EBG in presence of battery effects, Electronics Letters, Jun. 28, 2018, vol. 54, No. 13, pp. 789-800.
Qu et al., Decoupling between ground radiation antennas with ground-coupled loop-type isolator for WLAN applications, IET Microwaves, Antennas & Propagation, 2018, pp. 546-552.
Liu et al., Loop-type ground antenna using resonated loop feeding, intended for mobile devices, Electronics Letters, Mar. 31, 2011, vol. 47, No. 7, 2 pgs.
Piao et al., MIMO Ground-Radiation Antennas Using a Novel Closed-Decoupling-Loop for 5G Applications, IEEE 2020, pp. 142714-142724.
Kim et al., Miniaturized dual-band loop-type ground radiation antenna with enhanced bandwidth for mobile devices, Microw Opt Technol Lett., 2019, pp. 239-243.
Zahid et al., Performance evaluation of loop-type ground radiation antenna based on its optimum impedance level, Electronics Letters, Mar. 30, 2017, vol. 53, No. 7, pp. 446-448.
Hassan et al., A wideband loop-type ground radiation antenna using ground mode tuning and optimum impedance level, Microw Opt Technol Lett., 2019, pp. 1-6.
Johanson Technology, *High Frequency Ceramic Solutions*, 5 pgs., Oct. 12, 2020.
Office communication in U.S. Appl. No. 15/845,369, 17 pgs.
Office communication in U.S. Appl. No. 15/845,369, 15 pgs.
Office communication in U.S. Appl. No. 15/845,369, 12 pgs.
Office communication in U.S. Appl. No. 16/237,511, 15 pgs.
Office communication in U.S. Appl. No. 16/719,925, 15 pgs.
Office communication in U.S. Appl. No. 16/724,160, 28 pgs.
Search report in CN application 201911132444X, 2 pgs.
Office communication in U.S. Appl. No. 15/845,327, 3 pgs.
Office communication in U.S. Appl. No. 16/237,511, 22 pgs.
Office communication in U.S. Appl. No. 16/719,925, 18 pgs.
Office communication in U.S. Appl. No. 16/719,925, 22 pgs.
Office communication in U.S. Appl. No. 15/845,327, 6 pgs.
Office communication in U.S. Appl. No. 15/845,369, 10 pgs.
Office communication in U.S. Appl. No. 16/237,511, 31 pgs.
Office communication in U.S. Appl. No. 17/705,260, 7 pgs.

* cited by examiner

APPARATUS FOR ANTENNA OPTIMIZATION AND ASSOCIATED METHODS

TECHNICAL FIELD

The disclosure relates generally to radio-frequency (RF) wireless apparatus and associated methods. More particularly, the disclosure relates to apparatus for antenna optimization of radio modules and associated methods.

BACKGROUND

With the advent of technologies such as Internet of things (IoT), the number of wireless devices has increased. Radio modules are generally used to speed up time to market and to reduce the certification burden of end products. While the modules provide a benefit of providing plug in pre-certified solution for the end product manufacturers, the benefit typically comes with a penalty of suboptimal performance and trade off in the mechanical design of the end product. This is because with the modules the antenna is not optimal in the end product assembly. The antenna of a module is affected by the installation, and the module installation in the end product may lead to reduced communication range, increased power consumption, and EMC issues.

IoT devices in general are designed for long battery life, and increased power consumption will have a direct impact on the battery lifetime of the end product. Depending on the modulation type, a detuned antenna may also lead the module to become non-compliant in regional certifications, and can lead to technical challenges that are relatively difficult to solve in the end product because the module itself cannot be modified. The module is certified as-is, and it cannot be modified by the end product's manufacturer.

The description in this section and any corresponding figure(s) are included as background information materials. The materials in this section should not be considered as an admission that such materials constitute prior art to the present patent application.

SUMMARY

A variety of apparatus and associated methods are contemplated according to exemplary embodiments. According to one exemplary embodiment, an apparatus includes a module comprising an antenna having at least one antenna component. The apparatus further includes at least one tuning component coupled to the at least one antenna component. The at least one tuning component is external to the module.

According to another exemplary embodiment, an apparatus a module comprising a ground (GND) radiating loop antenna having at least one antenna component. The apparatus further includes at least one tuning component coupled to the at least one antenna component. The at least one tuning component is external to the module. The at least one tuning component is used to tune a center frequency of the antenna.

According to another exemplary embodiment, a method of tuning an antenna, which has at least one antenna component and is included in a module, includes coupling at least one tuning component to the at least one antenna component. The at least one tuning component is external to the module.

BRIEF DESCRIPTION OF THE DRAWINGS

The appended drawings illustrate only exemplary embodiments and therefore should not be considered as limiting the scope of the application or of the claimed subject-matter. Persons of ordinary skill in the art will appreciate that the disclosed concepts lend themselves to other equally effective embodiments. In the drawings, the same numeral designators used in more than one drawing denote the same, similar, or equivalent functionality, components, or blocks.

DETAILED DESCRIPTION

The disclosed concepts relate generally to surface mountable wireless apparatus including antennas. More specifically, the disclosed concepts provide apparatus and methods for antenna optimization, and associated methods. The terms optimization, tuning, and fine-tuning are used interchangeably in this document to refer to optimizing antenna performance and/or characteristics for a given application or end-use.

Figure 1:
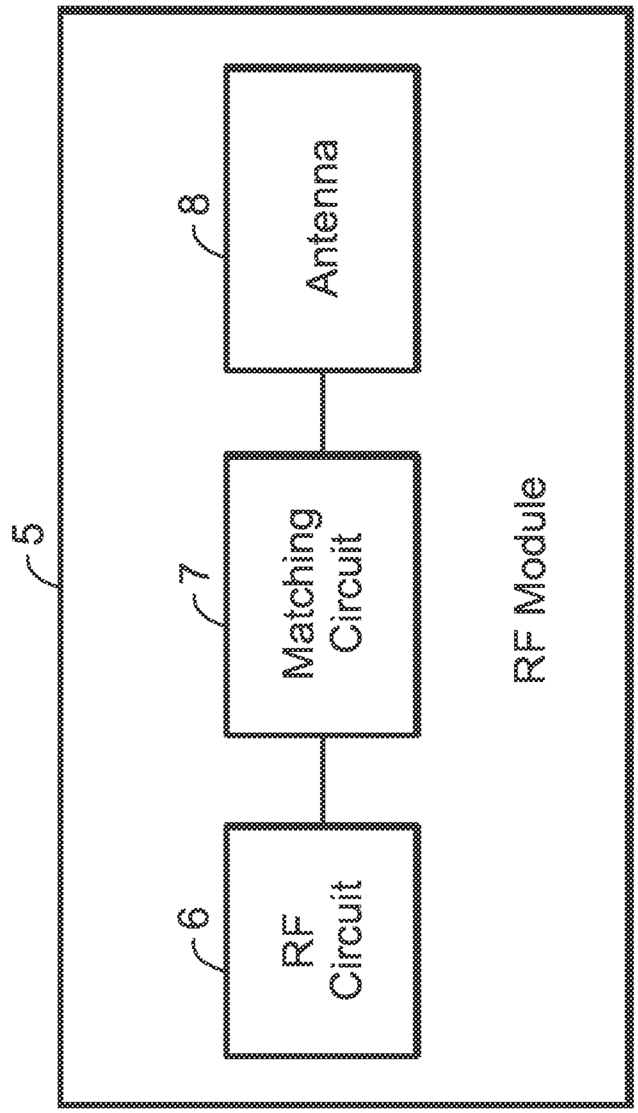
Prior Art Fig. 1
FIG. 1 shows a circuit arrangement for a conventional RF module.

FIG. 1 shows a circuit arrangement for a conventional RF module 5. The RF module 5 includes the RF circuit 6, the matching circuit 7, and the antenna 8. The matching circuit 7 matches the impedance of the RF circuit 6 to the impedance of the antenna 8. The operation of the circuit is well understood and well known to persons of ordinary skill in the art.

The antenna 8 in the module 5 uses a ground plane as part of resonator and as the radiator. Virtually all antennas are more or less sensitive to size and shape of the ground plane and to capacitive loading, such as from the module's plastic enclosure, printed-circuit board (PCB) conformal coating, or protective potting compound. In normal case (when not using a module) the antenna is tuned particularly for the end product and this Is not a problem.

However, when the module 5 is used, the matching circuit 7 and the antenna 8 are embedded (or included or encapsulated) into the module 5, and the module integrator does not have any access to the components to change the characteristics of, and optimize, the antenna 8.

Because the various circuits and components are embedded into the module 5, a user or integrator of the module 5 cannot tune the various characteristics of the circuitry/devices with in the module 5 because of the lack of physical access mentioned above. Thus, when using the module 5 with the integral antenna 8, there is a trade-off between the convenience of an inclusive module (which includes the RF circuit, the matching circuit, and the antenna) with the performance of the circuit, in particular, the antenna.

In exemplary embodiments, antennas may be tuned, fine-tuned or optimized by using one or more components external to a surface mountable module that includes the antenna. In the exemplary embodiments, the antenna constitutes an embedded (into a module) LC loop antenna. By using one or more tuning components (which are external to the module that includes the antenna), the center frequency of the antenna can be adjusted higher or lower, and thus compensate, correct, or minimize the effects of the end-product installation (including the module) or mechanical design (including the module) on the antenna's performance.

In exemplary embodiments, the module may be an RF module, as desired. Generally, the module may be an enclosure that does not allow access (or does not allow easy access, say, without opening, disassembling, or removing part of the module) to the antenna components in order to tune the antenna.

In exemplary embodiments, ground (GND) radiating loop antennas embedded in a module, which are difficult or impractical or impossible to optimize or tune as noted above, may be tuned by using one or more external tuning components. Generally, the external tuning component(s) is/are coupled in parallel with an antenna component, such as radiator loop component (e.g., a capacitor) or a feeding loop component (e.g., a capacitor).

By virtue of using external tuning component(s), in exemplary embodiments the antenna may be tuned without access to the internal (to the module) antenna structures. In other words, without opening, disassembling, removing part of, or otherwise gaining physical access to the circuitry within the module, the antenna may be tuned by using one or more external tuning components.

In order to couple the external tuning component(s) to the internal (to the module) antenna component(s), one or more pads (not shown in the figure) of the module may be used. More specifically, the module typically has a set of pads (usually beneath or at the perimeter of the module's physical enclosure). The pads may be used to provide a coupling to one or more internal antenna components.

The pads may further be coupled to one or more external tuning components. The internal antenna component(s) is/are therefore coupled to the external tuning component(s). As a result, the antenna may be tuned or optimized without physical access to, or modifying or changing, the antenna components.

The number, type, and values of the tuning components depend on factors such as antenna design and specifications (e.g., how may antenna components are used, and their types and values), available materials and components, cost, desired performance, implementation, end-use or target product or market, etc., as persons of ordinary skill in the art will understand. The type and/or values of the tuning components may be determined by using simulation, trial and error, etc., as persons of ordinary skill in the art will understand.

Figure 2:
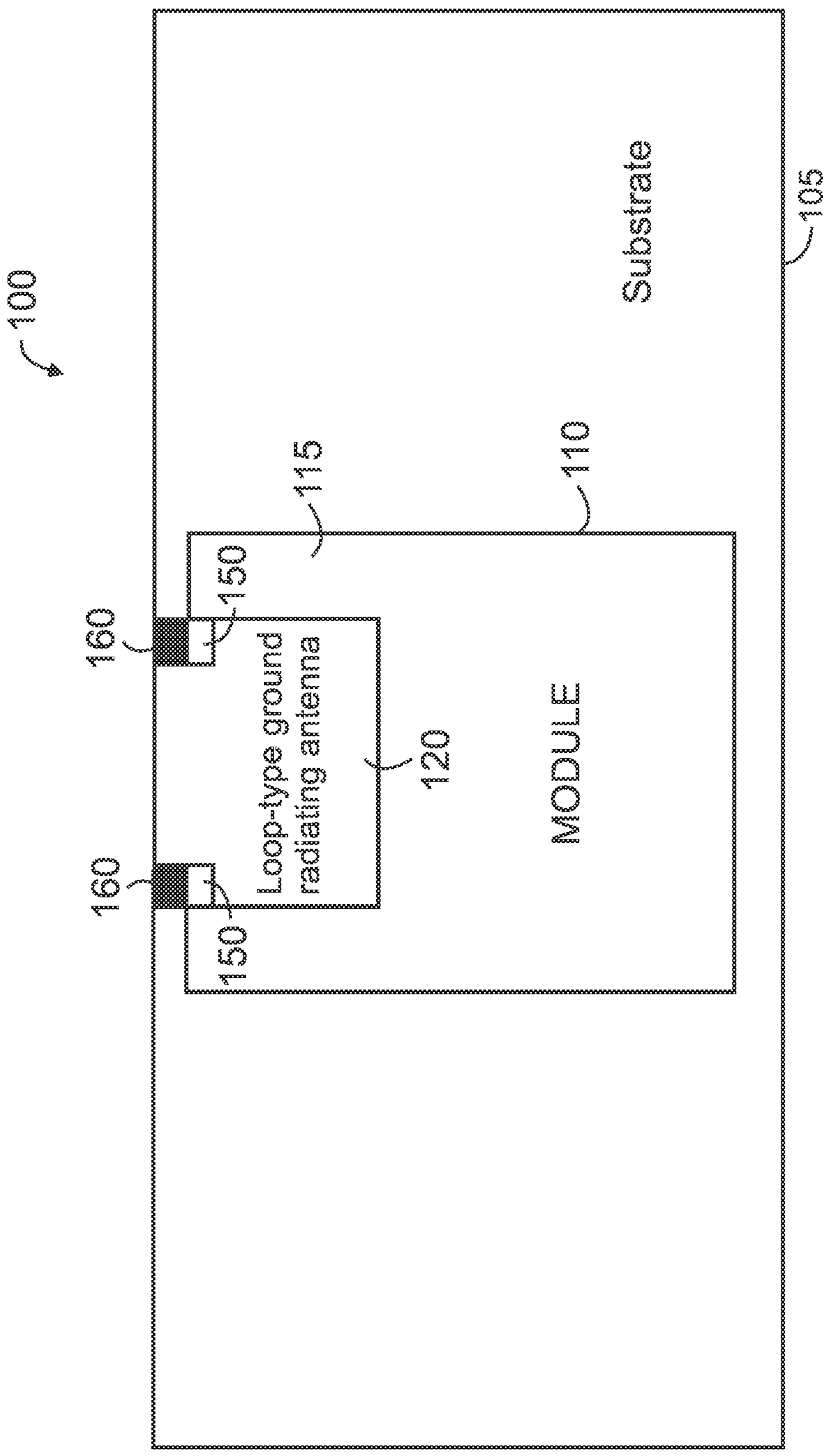
FIG. 2 shows an apparatus for antenna optimization according to an exemplary embodiment.

FIG. 2 shows an apparatus 200 for antenna tuning according to an exemplary embodiment. The apparatus 100 includes a substrate 105. The substrate 105 may have a variety of forms (e.g., multi-layered) and may be constructed of a variety of materials (e.g., PCB base, FR4, etc.), as persons of ordinary skill in the art will understand. Generally speaking, the substrate 105 has a non-conducting base (e.g., FR4), with one or more conductive layers formed on and/or below the non-conducting base.

A surface mountable module 110 is affixed or mounted or physically attached to the substrate 105. The module 110 may be an RF module. In that case, the module 110 may include RF circuitry (receiver, transmitter, or transceiver), impedance matching circuitry, etc., as persons of ordinary skill in the art will understand.

As noted above, the module 110 has a set of pads that are used to electrically couple the module 110 to other circuitry. In some embodiments, the pads may be used to physically attach the module 110 to the substrate 105 (e.g., by using the pads to solder the module 110 to the substrate 105).

The substrate 105 has one or more conductive layers (e.g., copper). Traces may be formed in the conductive layer(s) to couple various circuits or blocks together. For example, traces may be used to couple the module 110 to other circuitry (not shown) coupled to the substrate 105 via traces.

The module 110 includes an antenna. The antenna constitutes a ground radiating loop antenna, as noted above. The antenna is formed by using a loop and one or more antenna components 150. The loop is coupled to the antenna component(s) 150. In the example shown in the figure, two antenna components 150 are used.

The loop is formed by removing (e.g., etching part of a copper layer of the substrate 105) part of a conductive layer of the substrate 105. The removed part leaves a void (or clearance area) 120.

In other words, the void 120 lacks any conductive material (because part of a conductive layer was removed to form the void 120) and does not conduct current. As a result, a loop is formed around the void 120. The loop is used together with the antenna component(s) to form a ground radiating loop antenna, as persons of ordinary skill in the art will understand.

In the example shown in the figure, two tuning components 160 are used. The tuning components 160 are coupled to the two respective antenna components. The tuning components 160 are used to tune the antenna, as noted above. More specifically, the tuning component(s) are used to change the center frequency of the antenna, by either increasing or decreasing its value, in order to tune the antenna for a particular implementation, end-use, product, etc.

In the example shown in the figure, the antenna uses two antenna components 150. As persons of ordinary skill in the art will understand, however, different numbers of antenna components 150 may be used, depending on factors such as antenna design and specifications, available materials and components, cost, desired performance, implementation, end-use or target product or market, etc.

Furthermore, in the exemplary embodiment shown, two antenna tuning components 160 are used. As persons of ordinary skill in the art will understand, however, different numbers of tuning components 160 may be used, depending on factors such as antenna design and specifications, available materials and components, cost, desired performance, implementation, end-use or target product or market, etc. As described below in detail, the tuning components may use a variety of electrical components.

In exemplary embodiments, the antenna components 150 may constitute one or more capacitors, one or more inductors, and/or one or more chip antennas (including a mix of one or more capacitors, one or more inductors, and one or more chip antennas), as persons of ordinary skill in the art will understand. The number, type, values, and configuration or topology of capacitor(s), inductors, and/or chip antenna(s) depends on factors such as antenna design and specifications, available materials and components, cost, desired performance, implementation, end-use or target product or market, etc., as persons of ordinary skill in the art will understand.

Furthermore, in exemplary embodiments, the tuning components 160 may constitute one or more capacitors and/or one or more inductors (including a mix of one of or more capacitors with one or more inductors). The number, type, values, and configuration or topology of capacitor(s) and/or inductor(s) depends on factors such as antenna design and specifications, available materials and components, cost, desired performance, implementation, end-use or target product or market, etc., as persons of ordinary skill in the art will understand.

Figure 3:
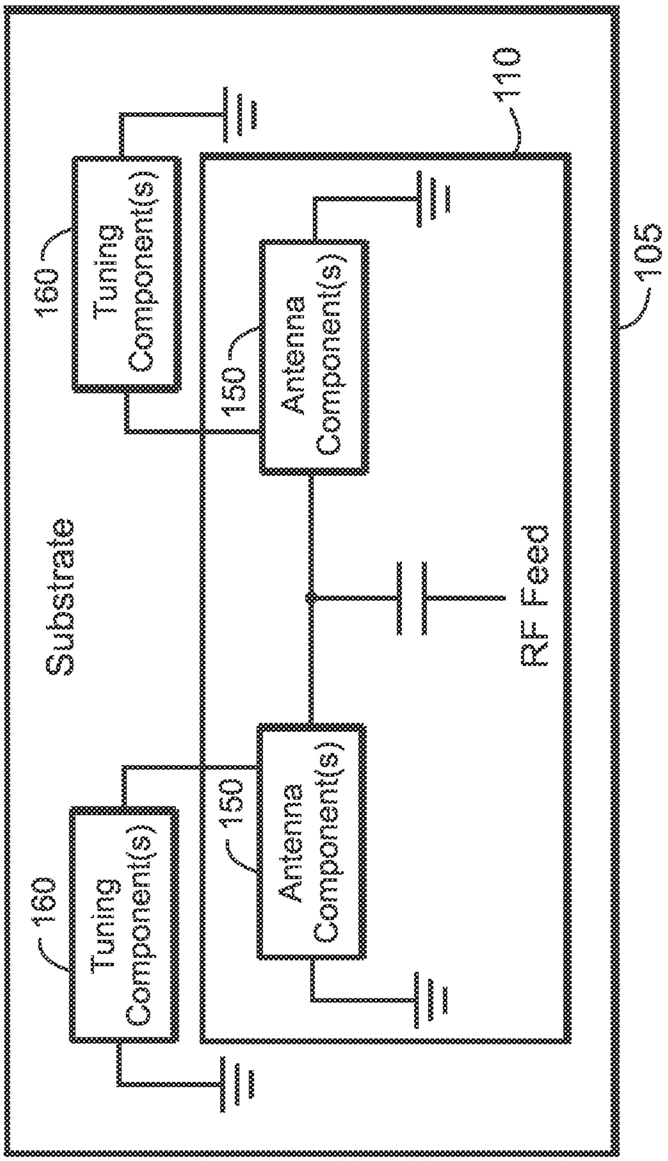
FIG. 3 shows a circuit arrangement for antenna optimization according to an exemplary embodiment.

FIG. 3 shows a circuit arrangement for antenna optimization according to an exemplary embodiment. More specifically, the circuit arrangement shows an antenna that is “symmetrical” or has two branches. In other words, the RF feed is provided to two antenna halves, on the right-side branch and on the left-side branch, respectively, each of which includes one or more antenna components 150. Each branch also has a tuning component 160 coupled in parallel with one or more of the antenna components 150.

Note that the exemplary embodiment in FIG. 3 shows one side or end or terminal of the tuning components 160 coupled to ground. Depending on the number of antenna components 150 on each branch of the antenna, the tuning components 160 may alternatively be coupled to one or more antenna components 150 that do not have one end or side or terminal coupled to ground (e.g., in parallel with a middle capacitor in a cascade of three series-coupled capacitors, i.e., the antenna components 150 including three series-coupled capacitors).

Figure 4:
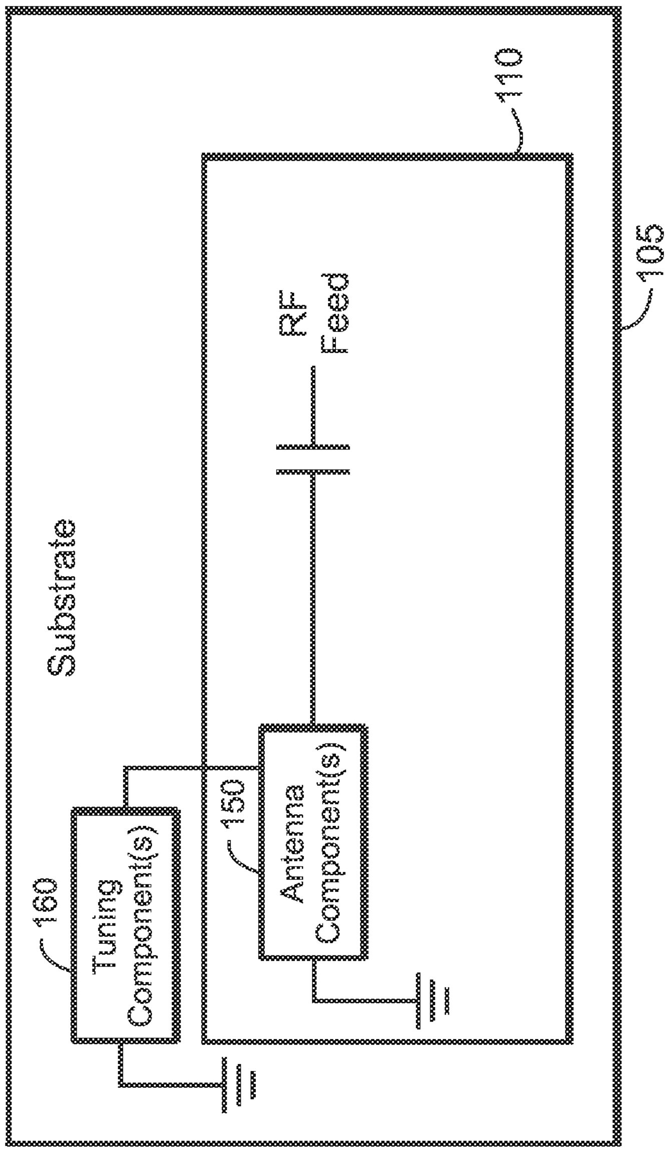
FIG. 4 shows another circuit arrangement for antenna optimization according to an exemplary embodiment.

FIG. 4 shows a circuit arrangement for antenna optimization according to an exemplary embodiment. More specifically, the circuit arrangement shows an antenna that is “asymmetrical” or has one branch. In other words, the RF feed is provided to one or more antenna components 150 without a mirror or symmetrical branch (as opposed to the “symmetrical case in FIG. 3). Referring again to FIG. 4, the circuit arrangement includes a tuning component 160 coupled in parallel with one or more of the antenna components 150.

Note that the exemplary embodiment in FIG. 4 shows one side or end or terminal of the tuning components 160 coupled to ground. Depending on the number of antenna components 150, the tuning components 160 may alternatively be coupled to one or more antenna components 150 that do not have one end or side or terminal coupled to ground (e.g., in parallel with a middle capacitor in a cascade of three series-coupled capacitors, i.e., the antenna components 150 including three series-coupled capacitors).

Figure 5:
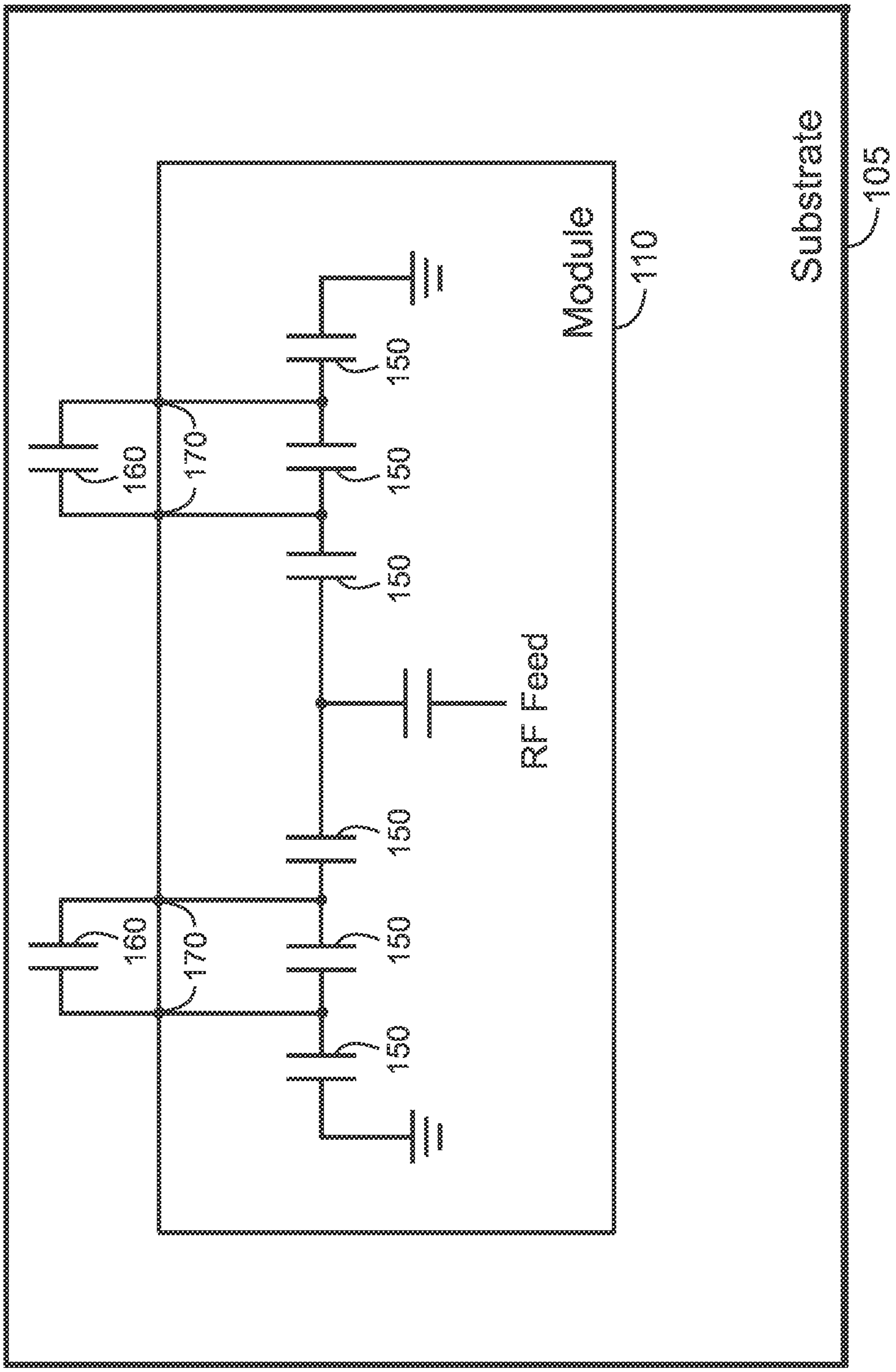
FIG. 5 shows another circuit arrangement for antenna optimization according to an exemplary embodiment.

FIG. 5 shows a circuit arrangement for antenna optimization according to an exemplary embodiment. The circuit arrangement is a more specific or specialized case of the embodiment shown in FIG. 3. More specifically, the antenna components 150 on each side or in each branch include three capacitors coupled in cascade or series.

The tuning components 160 includes a single capacitor in this example, which is coupled to the middle capacitor of the antenna components 150 using pads 170 of the module 110 (in other words, pads 170 were included at the time of manufacture and/or assembly of the module 110 to facilitate later addition of the tuning components 160).

Figure 6:
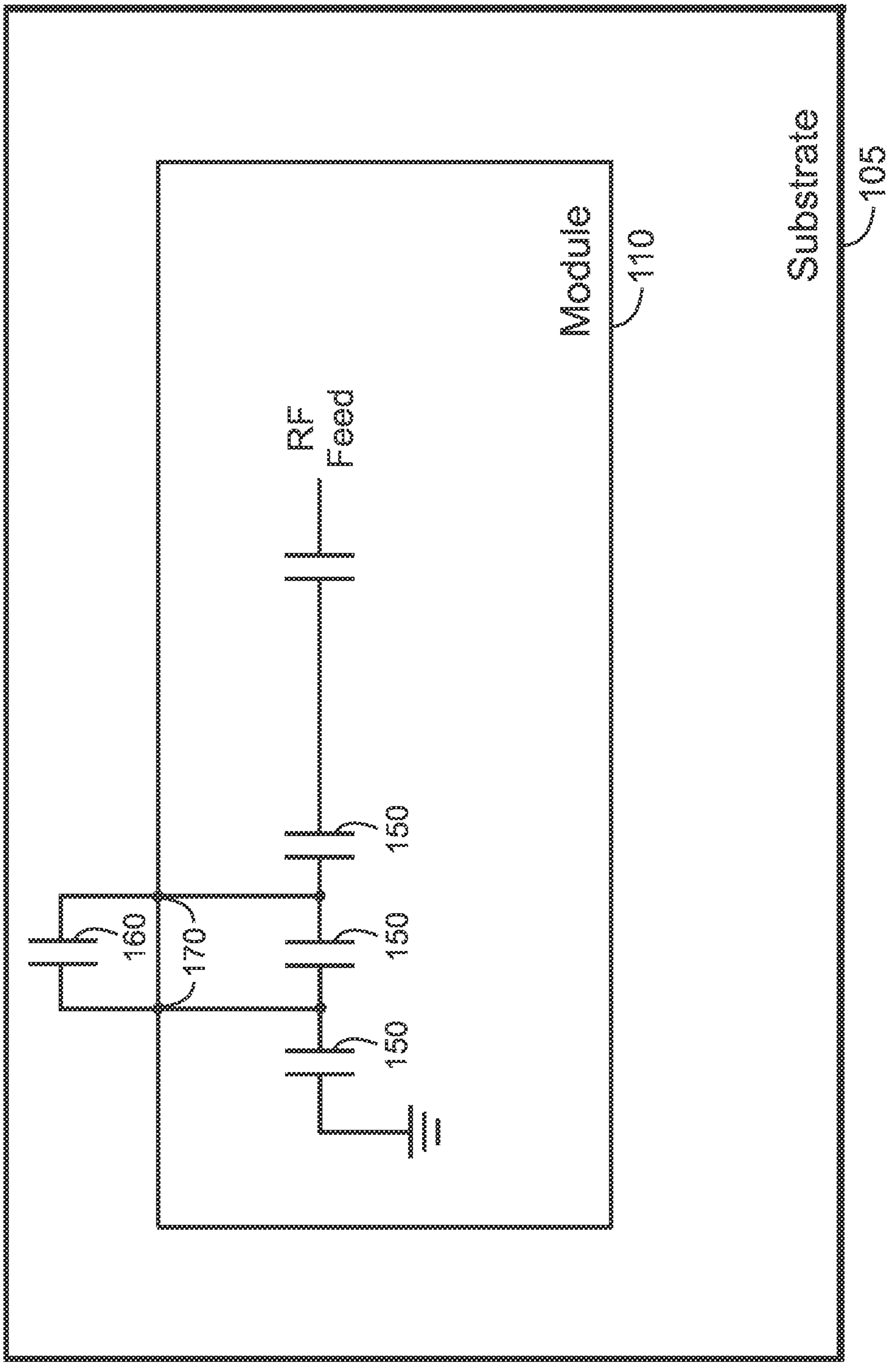
FIG. 6 shows another circuit arrangement for antenna optimization according to an exemplary embodiment.

FIG. 6 shows a circuit arrangement for antenna optimization according to an exemplary embodiment. The circuit arrangement is a more specific or specialized case of the embodiment shown in FIG. 4. More specifically, the antenna components 150 on the single antenna branch include three capacitors coupled in cascade or series.

The tuning components 160 includes a single capacitor in this example, which is coupled to the middle capacitor of the antenna components 150 using pads 170 of the module 110 (in other words, pads 170 were included at the time of manufacture and/or assembly of the module 110 to facilitate later addition of the tuning components 160).

Note that the embodiments shown in FIGS. 3-6 constitute merely exemplary embodiments. As noted and as persons of ordinary skill in the art understand, a variety of structures may be used for ground radiating loop antennas. For example, “symmetrical” or “asymmetrical” configurations may be used, or the topology or configuration or the number of loops used may vary from design to design, as persons of ordinary skill in the art will understand.

Regardless of the specific antenna structure used, external (to the module 110) one or more tuning components may be used to tune the antenna, as desired. Depending on the number of tuning components used, appropriate or corresponding number of pads 170 of the module 110 may be used to couple the tuning components 160 to the antenna components 150 in order to tune the antenna after the manufacture or assembly of the module 110.

Figure 8B:
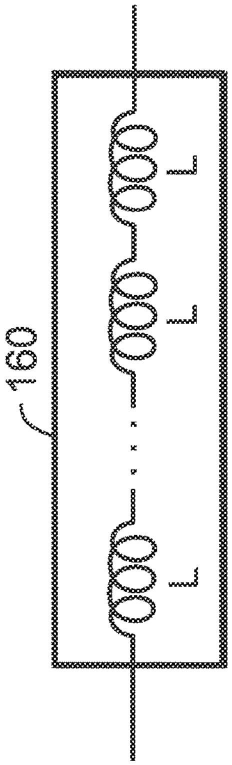
FIG. 8A-8B show tuning components according to exemplary embodiments.
Figure 9:
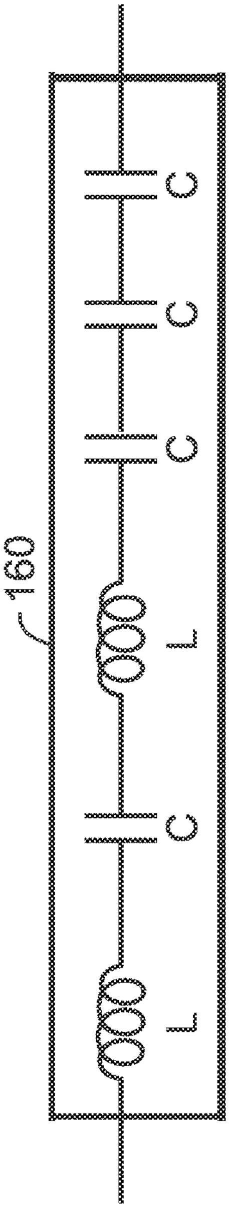
FIG. 9 shows a tuning component according to an exemplary embodiment.

As noted above, in exemplary embodiments, the tuning components 160 may constitute one or more capacitors and/or one or more inductors (including a mix of one of or more capacitors with one or more inductors). FIGS. 7-9 show some examples.

Figure 7B:
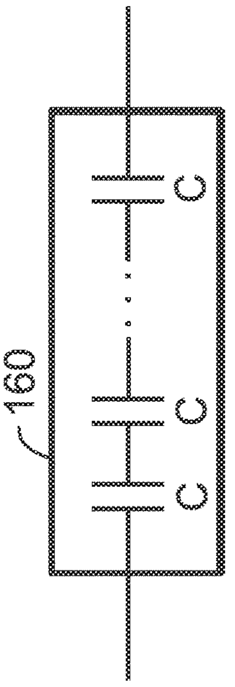
FIG. 7A-7B show tuning components according to exemplary embodiments.
Figure 7A:
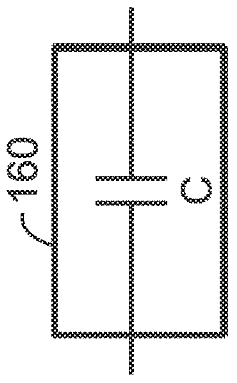

More specifically, FIG. 7A shows a tuning component 160 that includes a single capacitor C. Conversely, FIG. 7B shows a tuning component 160 that includes more than one capacitor, as indicated by the cascade coupling of a number of capacitors C (which may or may not have the same values, depending on the application). Note that taps may be used to access one or more of the internal nodes of the tuning component 160 and couple such node(s) to antenna structures 150, as desired.

Figure 8A:
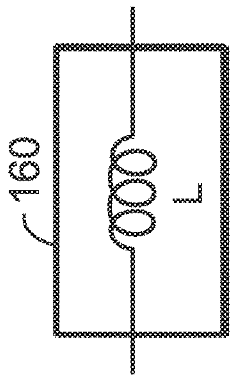
Figure 10:
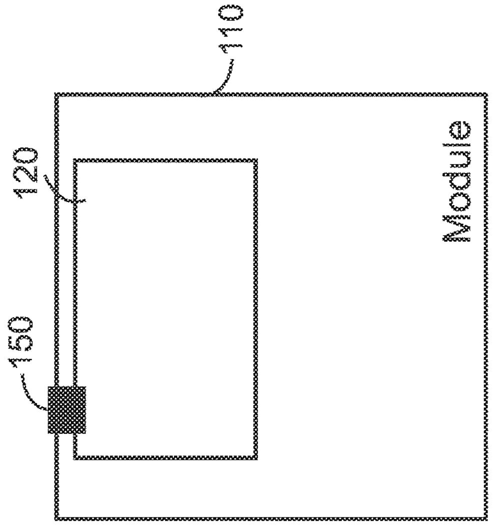
FIG. 10 shows an apparatus including a loop antenna.
Figure 11:
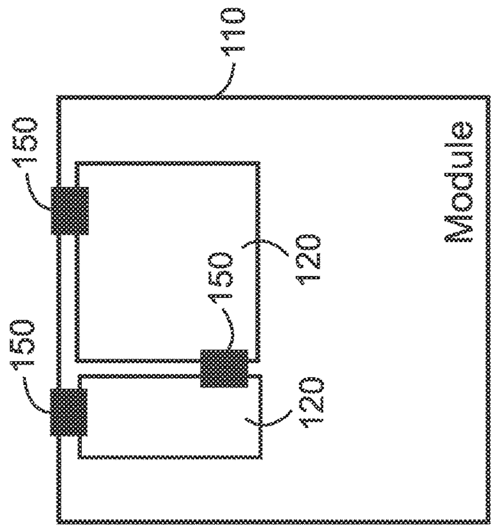
FIG. 11 shows another apparatus including a loop antenna.
Figure 12:
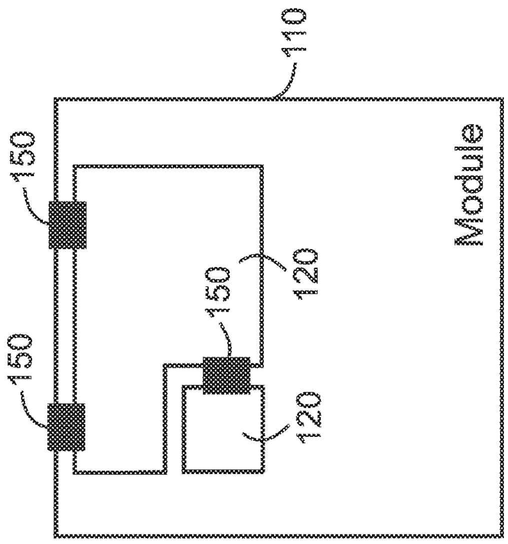
FIG. 12 shows another apparatus including a loop antenna.
Figure 13:
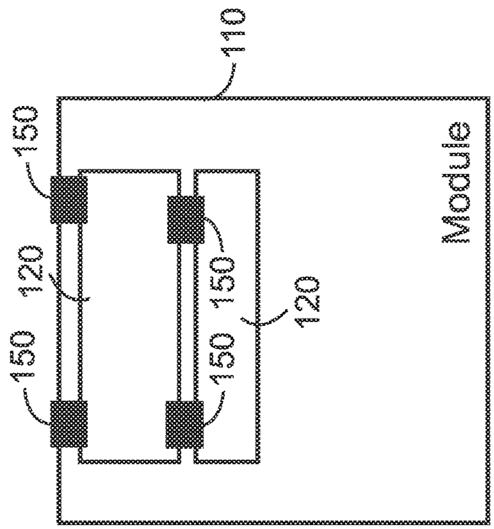
FIG. 13 shows another apparatus including a loop antenna.
Figure 14:
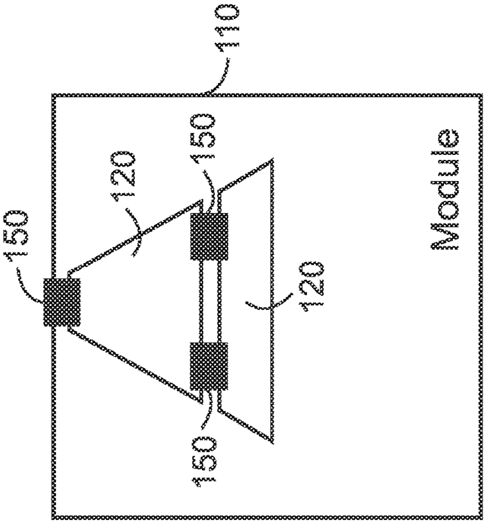
FIG. 14 shows another apparatus including a loop antenna.
Figure 15:
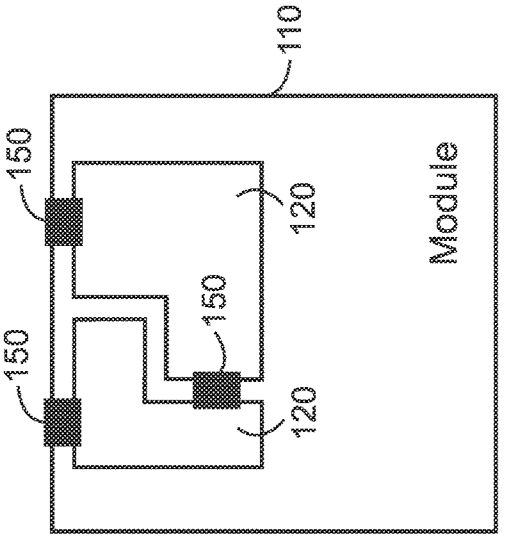
FIG. 15 shows another apparatus including a loop antenna.
Figure 16:
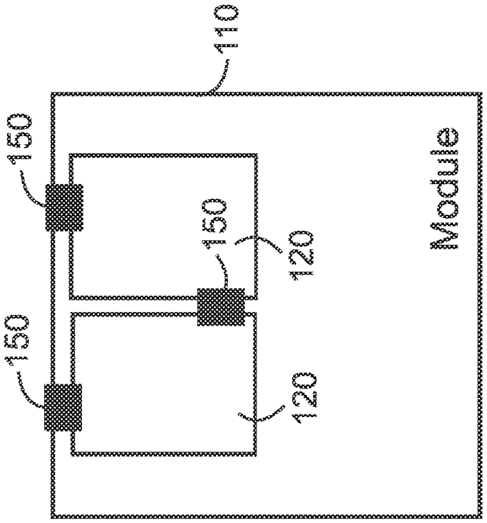
FIG. 16 shows another apparatus including a loop antenna.
Figure 17:
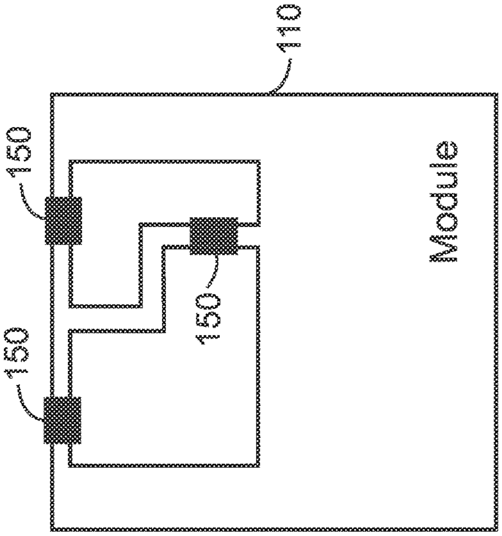
FIG. 17 shows another apparatus including a loop antenna.

FIG. 8A shows a tuning component 160 that includes a single inductor L. Conversely, FIG. 8B shows a tuning component 160 that includes more than one inductor, as indicated by the cascade coupling of a number of inductors L (which may or may not have the same values, depending on the application). Note that taps may be used to access one or more of the internal nodes of the tuning component 160 and couple such node(s) to antenna structures 150, as desired.

FIG. 9 shows a tuning component 160 that includes both inductors and capacitors. In the example shown more than one inductor and more than capacitor are used. Generally, in exemplary embodiments, one or more inductors and one or more capacitors may be used, as desired.

Referring again to FIG. 9, the tuning component 160 includes two inductors and four capacitors, all coupled in cascade. Note that the order of the components in the cascade as well as the type of components may be changed from the exemplary embodiment shown. The components (inductors and capacitors) may or may not have the same values, as desired.

In the example shown in FIG. 9, three capacitors are used in series fashion. Using a cascade of capacitors allows using larger-value capacitors, which would decrease the sensitivity of the overall capacitor cascade to tolerances of individual capacitors. Note that taps may be used to access one or more of the internal nodes of the tuning component 160 and couple such node(s) to antenna structures 150, as desired.

As noted above, the tuning components 160 may be used to tune a variety of configurations of ground radiating loop antennas. FIGS. 10-17 show examples of such antennas. Note that a variety of the number of antenna components 150 and the number and shape/configuration of loop(s) may be used in the antennas, as the examples in FIGS. 10-17 illustrate.

Regardless of the exact configuration of the ground radiating loop antennas, tuning components 160 may be used to tune such antennas. FIGS. 18-21 provide examples. More specifically, FIGS. 18-21 show tuning component(s) 160 added to the antennas shown in FIGS. 10-13, respectively, to tune them.

Figure 18:
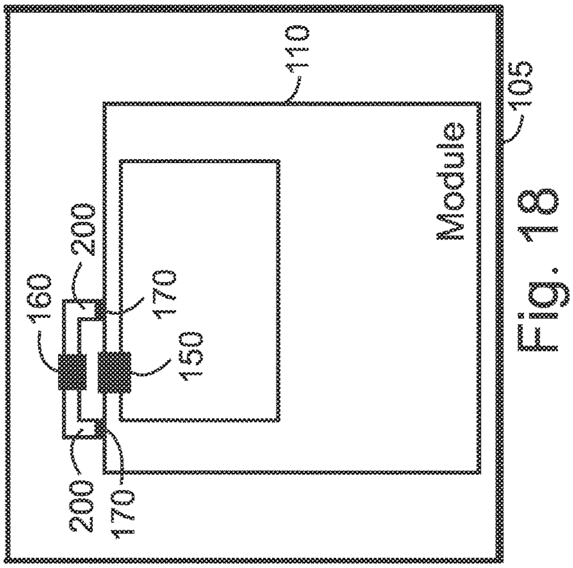
FIG. 18 shows an apparatus for antenna optimization according to an exemplary embodiment.

Referring to FIG. 18, the antenna has a single antenna component 150. Using traces 200 of the substrate 105 and the pads 170 of the module 170, a tuning component 160 is coupled to the antenna component 150 in order to tune the antenna.

Figure 19:
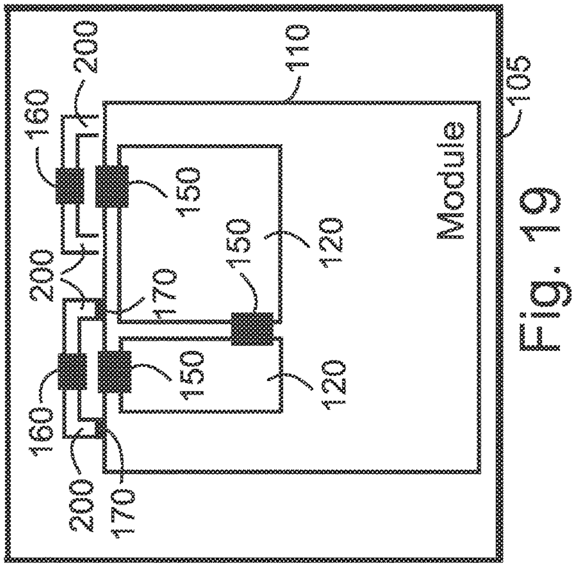
FIG. 19 shows another apparatus for antenna optimization according to an exemplary embodiment.

Referring to FIG. 19, the antenna has three antenna component 150. Using traces 200 of the substrate 105 and the pads 170 of the module 170, two tuning components 160 are coupled to the top-most antenna components 150 in order to tune the antenna.

Figure 20:
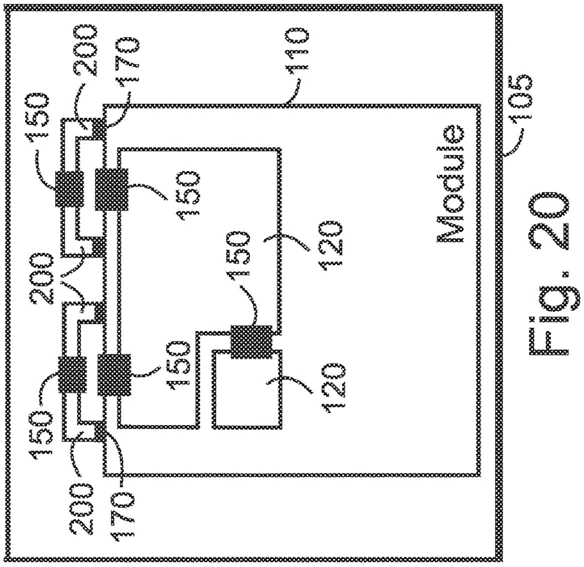
FIG. 20 shows another apparatus for antenna optimization according to an exemplary embodiment.

Similarly, referring to FIG. 20, the antenna has three antenna component 150. Using traces 200 of the substrate 105 and the pads 170 of the module 170, two tuning components 160 are coupled to the top-most antenna components 150 in order to tune the antenna.

Figure 21:
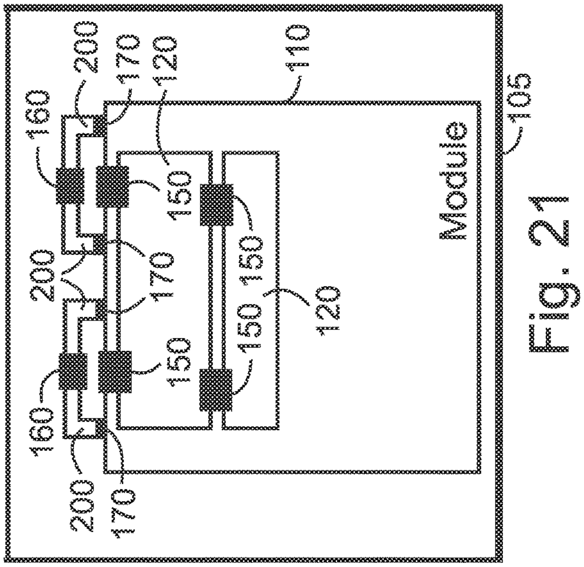
FIG. 21 shows another apparatus for antenna optimization according to an exemplary embodiment.

Referring to FIG. 21, the antenna has four antenna component 150. Using traces 200 of the substrate 105 and the pads 170 of the module 170, two tuning components 160 are coupled to the top-most antenna components 150 in order to tune the antenna.

Note that the examples shown in FIGS. 10-21 are merely illustrative. Different antenna structures, which may have different numbers of antenna components 150, and different numbers/configurations of tuning components 160 may be used in other embodiments, as desired, and as persons of ordinary skill in the art will understand.

Referring to the figures, persons of ordinary skill in the art will note that the various blocks shown might depict mainly the conceptual functions and signal flow. The actual circuit implementation might or might not contain separately identifiable hardware for the various functional blocks and might or might not use the particular circuitry shown. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation. Other modifications and alternative embodiments in addition to the embodiments in the disclosure will be apparent to persons of ordinary skill in the art. Accordingly, the disclosure teaches those skilled in the art the manner of carrying out the disclosed concepts according to exemplary embodiments, and is to be construed as illustrative only. Where applicable, the figures might or might not be drawn to scale, as persons of ordinary skill in the art will understand.

The particular forms and embodiments shown and described constitute merely exemplary embodiments. Persons skilled in the art may make various changes in the shape, size and arrangement of parts without departing from the scope of the disclosure. For example, persons skilled in the art may substitute equivalent elements for the elements illustrated and described. Moreover, persons skilled in the art may use certain features of the disclosed concepts independently of the use of other features, without departing from the scope of the disclosure.

The invention claimed is:

1. An apparatus, comprising:

a module comprising an antenna having at least one antenna component; and at least one tuning component coupled to the at least one antenna component, wherein the at least one tuning component is external to the module.

2. The apparatus according to claim 1, wherein the antenna comprises a ground (GND) radiating loop antenna.

3. The apparatus according to claim 1, wherein the at least one antenna component comprises a capacitor, an inductor, or a chip antenna.

4. The apparatus according to claim 1, wherein the at least one tuning component comprises at least one capacitor.

5. The apparatus according to claim 1, wherein the at least one tuning component comprises at least one inductor.

6. The apparatus according to claim 1, wherein the at least one tuning component comprises at least one capacitor coupled to at least one inductor.

7. The apparatus according to claim 6, wherein the at least one capacitor is coupled in cascade with the at least one inductor.

8. The apparatus according to claim 1, further comprising a substrate, wherein the module is physically attached to the substrate.

9. The apparatus according to claim 8, wherein the at least one tuning component is physically attached to the substrate, and wherein the at least one tuning component is electrically coupled to the module using a set of pads of the module.

10. An apparatus, comprising:

a module comprising a ground (GND) radiating loop antenna having at least one antenna component; and at least one tuning component coupled to the at least one antenna component, wherein the at least one tuning component is external to the module, and wherein the at least one tuning component is used to tune a center frequency of the antenna.

11. The apparatus according to claim 10, wherein the at least one tuning component comprises at least one capacitor.

12. The apparatus according to claim 10, wherein the at least one tuning component comprises at least one inductor.

13. The apparatus according to claim 10, wherein the at least one tuning component comprises at least one capacitor coupled to at least one inductor.

14. The apparatus according to claim 10, further comprising a substrate, wherein the module and the at least one tuning component are physically attached to the substrate, and wherein the at least one tuning component is electrically coupled to the module using a set of pads of the module.

15. A method of tuning an antenna, having at least one antenna component and included in a module, the method comprising coupling at least one tuning component to the at least one antenna component, wherein the at least one tuning component is external to the module.

16. The method according to claim 15, wherein the antenna comprises a ground (GND) radiating loop antenna.

17. The method according to claim 15, wherein the at least one antenna component comprises a capacitor, an inductor, or a chip antenna.

18. The method according to claim 15, wherein the at least one tuning component comprises at least one capacitor.

19. The method according to claim 15, wherein the at least one tuning component comprises at least one inductor.

20. The method according to claim 15, wherein the at least one tuning component comprises at least one capacitor coupled to at least one inductor.

* * * * *